(12) United States Patent
Watson et al.

(10) Patent No.: US 11,297,461 B2
(45) Date of Patent: Apr. 5, 2022

(54) GEOFENCING IN COMMERCIAL TRANSPORT VEHICLES

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 1 day.

(21) Appl. No.: 16/867,389

(22) Filed: May 5, 2020

(65) Prior Publication Data

US 2021/0352432 A1 Nov. 11, 2021

(51) Int. Cl.
| | |
|---|---|
| *H04W 4/021* | (2018.01) |
| *H04W 76/10* | (2018.01) |
| *H04W 4/80* | (2018.01) |
| *H04W 48/04* | (2009.01) |
| *H04W 12/122* | (2021.01) |
| *H04W 88/08* | (2009.01) |
| *H04W 84/12* | (2009.01) |
| *H04W 84/04* | (2009.01) |

(52) U.S. Cl.
CPC ............ *H04W 4/021* (2013.01); *H04W 4/80* (2018.02); *H04W 12/122* (2021.01); *H04W 48/04* (2013.01); *H04W 76/10* (2018.02); *H04W 84/042* (2013.01); *H04W 84/12* (2013.01); *H04W 88/08* (2013.01)

(58) Field of Classification Search
CPC . H04W 28/0268; H04W 24/02; H04W 48/16; H04W 48/18; H04W 4/021; H04W 48/06; H04W 4/80; H04W 84/12; H04W 12/00; H04W 12/35; H04W 4/02; H04W 4/18; H04W 84/06; H04W 12/122; H04W 48/04; H04W 76/10; H04W 84/042; H04W 88/08; H04L 47/805; H04L 49/205; H04L 47/20; H04L 63/1416; H04L 67/10; H04L 67/12; G06Q 10/10; G06Q 10/0639; H04M 2242/15
See application file for complete search history.

(56) References Cited

U.S. PATENT DOCUMENTS

| | | | |
|---|---|---|---|
| 9,154,951 B2 | 10/2015 | Kubisch | |
| 10,484,114 B1* | 11/2019 | Nijim | .......... H04W 4/021 |
| 2014/0065954 A1 | 3/2014 | Ovens | |
| 2015/0148989 A1 | 5/2015 | Cooper et al. | |
| 2015/0235266 A1* | 8/2015 | Jain | ............ H04W 4/021 |
| | | | 705/14.58 |
| 2015/0279130 A1 | 10/2015 | Robertson et al. | |

(Continued)

*Primary Examiner* — Daniel Lai
(74) *Attorney, Agent, or Firm* — Perkins Coie LLP (57) ABSTRACT

Devices, systems and methods for geofencing in commercial transport vehicles are disclosed. An exemplary method includes establishing, based on a heat map of signal strength at frequencies used by a first wireless protocol in the commercial transport vehicle, a geofence for communication by a user, and controlling, based on the geofence, an availability or a level of one or more services to the user, wherein the geofence comprises one or more boundaries within the commercial transport vehicle, and wherein the one or more services are deactivated if a location of the user is outside the one or more boundaries of the geofence.

16 Claims, 11 Drawing Sheets

(56) References Cited

U.S. PATENT DOCUMENTS

| | | |
|---|---|---|
| 2016/0095045 A1 | 3/2016 | Salomon et al. |
| 2016/0180017 A1* | 6/2016 | Savian ...................... B64F 5/00 |
| | | 703/8 |
| 2018/0213409 A1* | 7/2018 | Zhao ..................... H04W 16/18 |
| 2018/0229827 A1* | 8/2018 | Cafaro ................... G05B 15/02 |
| 2018/0338329 A1 | 11/2018 | Sergakis et al. |
| 2019/0164319 A1* | 5/2019 | Callender ............... H04W 4/00 |

* cited by examiner

GEOFENCING IN COMMERCIAL TRANSPORT VEHICLES

TECHNICAL FIELD

This document is directed generally to enhancing the passenger experience and improving security in commercial transport vehicles.

BACKGROUND

Commercial travel has evolved to securely provide customized entertainment and software options to passengers. Increasing personalized interaction opportunities with passengers on airplanes, trains and motor coaches (busses), which are typically integrated with security features and systems, are integral to future on-board and in-vehicle entertainment systems.

SUMMARY

Embodiments of the disclosed technology enable commercial transport vehicle companies to implement geofencing to control access to and/or provide services to passengers and crew members on commercial transport vehicles. In an example, this is achieved by setting up a geofence based on a heat map of signal strength at frequencies used by a wireless protocol in the commercial transport vehicle, and subsequently improving the passenger experience and aircraft security based on the geofence.

In one exemplary aspect, a method for geofencing in a commercial transport vehicle includes establishing, based on a heat map of signal strength at frequencies used by a first wireless protocol in the commercial transport vehicle, a geofence for communication by a user, and controlling, based on the geofence, an availability or a level of one or more services to the user, wherein the geofence comprises one or more boundaries within the commercial transport vehicle, and wherein the one or more services are deactivated if a location of the user is outside the one or more boundaries of the geofence.

In another exemplary aspect, a system for geofencing in a commercial transport vehicle includes a hardware token issued to a flight crew member of the commercial transport vehicle, a plurality of wireless access points (WAPs), and a processor that is configured to establish, based on a heat map of signal strength at frequencies used by a wireless protocol, a geofence for communication by the flight crew member, and provide, based on the geofence and a location of the hardware token on the commercial transport vehicle, one or more services to the flight crew member, wherein the wireless protocol is used by the plurality of WAPs, wherein the geofence comprises one or more boundaries within the commercial transport vehicle, and wherein the hardware token is made unavailable to passengers of the commercial transport vehicle.

In yet another exemplary aspect, a non-transitory computer-readable storage medium having instructions stored thereupon for geofencing in a commercial transport vehicle includes instructions for receiving, from an external database, a heat map of signal strength at frequencies used by a first wireless protocol in the commercial transport vehicle, instructions for establishing, based on the heat map, a geofence for communication by a passenger, and instructions for controlling, based on the geofence, an availability or a level of one or more services to the passenger, wherein the geofence comprises one or more boundaries within the commercial transport vehicle, and wherein the one or more services are deactivated if a location of the passenger is outside the one or more boundaries of the geofence.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Presently, commercial passenger transportation technologies have begun to offer various digital services to passenger during travel. For example, in commercial vehicles such as busses, railways and airplanes, internet connectivity is being offered to passengers. At the same time, digital connectivity in the form of wired or wireless networks is used in commercial vehicles to control vehicle operation and/or crew's controls of services offered on the vehicles.

Geofencing uses location-based services to implement a virtual perimeter for a real-world geographic area. The geofence can be used once the geolocation data of an entity is available, which can be obtained through a GPS-enabled hardware (e.g., a smartphone, a car with a GPS receiver, and the like) or triangulation based on wireless protocols (e.g., BLUETOOTH, WI-FI, and the like). In general, services can be provided based on the location of the entity.

Geofencing applications create a geofence and then establish triggers that activate or deactivate one or more programs or applications based on the entity entering or leaving the geofenced area. For example, a user or entity entering the real-world geographic area enclosed by a virtual geofence can receive a text message, an email alert or a push notification related to services or opportunities available within the geofenced area.

There are a variety of ways that geofencing can be used to create meaningful and valuable customer experiences because a unique user experience is created that are specific to the context of the location. In an example, proximity-based marketing can provide discounts or rewards to a user based on a user being near a store. In another example, location-based services can be used to remind a user of an upcoming service or an incentive to get service when the user is near a service provider.

Embodiments of the disclosed technology implement a geofence in commercial transport vehicles to provide services and controlling access to services based on positions and geofencing. In an example, this is achieved by setting up a geofence within the entirety or a portion of the commercial transport vehicle. In another example, services can be provided and their access controlled separately for both passengers and crew members of commercial transport vehicle. For example, in certain locations in the airplane, such as kitchen or facilities areas, only crew may be able to access airplane services. As another example, a passenger's access to digital services or a wireless network may be restricted to the passenger's assigned seat or assigned class (e.g., business or economy, etc.) that the passenger is traveling in.

The present document uses examples with the commercial transport vehicle being an aircraft only to facilitate understanding, and the disclosed techniques embodiments may be practiced in other commercial transport vehicles, e.g., trains or motor coaches (buses).

Passenger PED Pairing with Fixed Seat Equipment

In some embodiments, the geofencing can be used for cyber security to ensure that the avionics software in an aircraft is not compromised. When a passenger boards an aircraft, the passenger typically uses a portable electronic device (PED) to control the in-flight entertainment connectivity (IFEC) system after the PED is paired with the IFEC system. In existing systems, an attacker may pair a PED with a seat that is far from his assigned seat or location, obtain a PIN code from the IFEC system, and use that seat's IFEC system (termed the "attacking seat") to hack into and compromise the avionics software. In an example, the attacker may walk to the attacking seat to approve the pairing and obtain the PIN code. In another example, an accomplice closer to the attacking seat may carry out the process of obtaining the PIN code.

Figure 1:
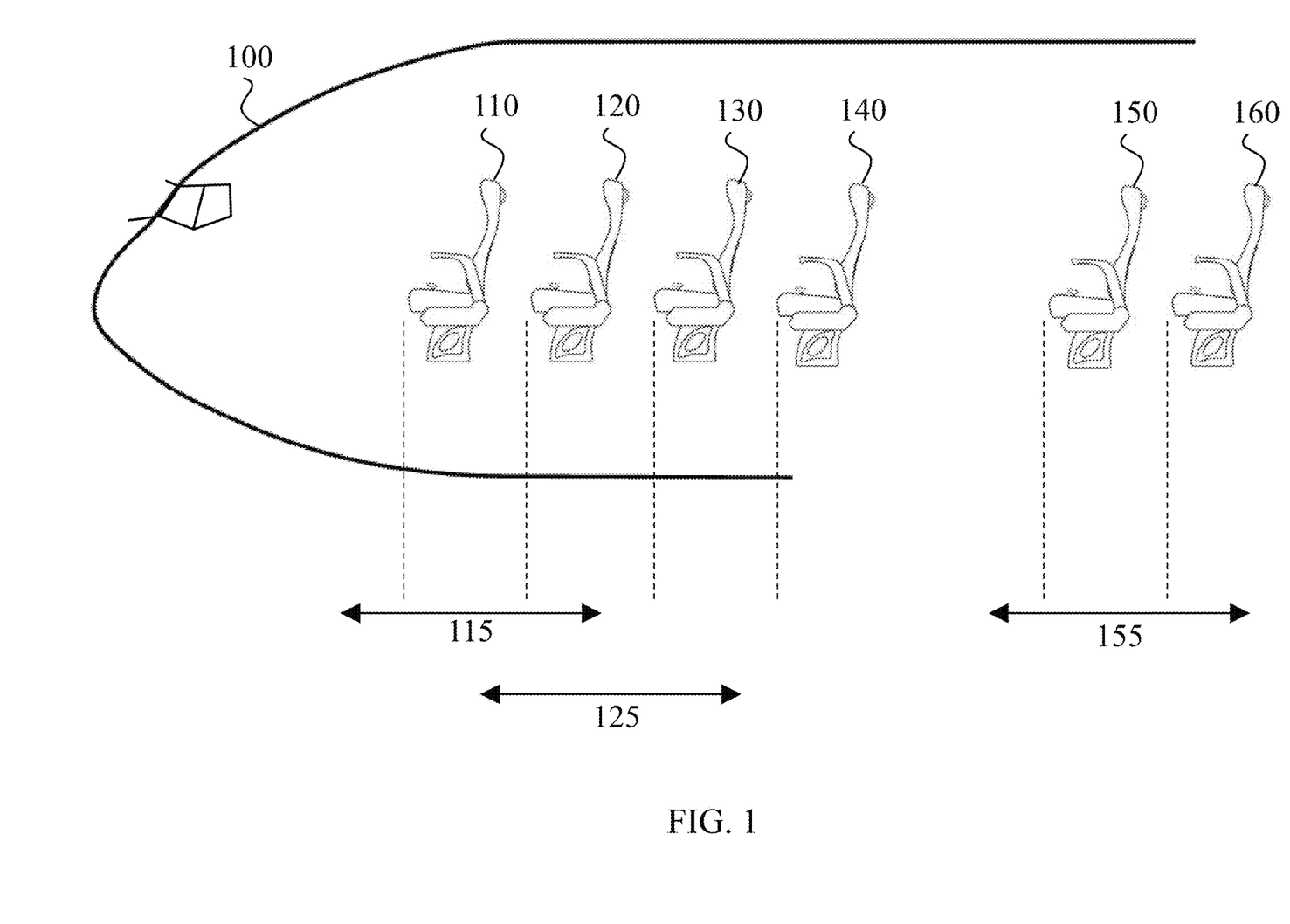
FIG. 1 shows an example of using a geofence for cyber security in an aircraft.

FIG. 1 shows an example of using geofencing to provide cyber security for the PED pairing process. As shown therein, an aircraft 100 comprises seats 110, 120, . . . , 160, each of which can be configured with a geofence. For example, seats 110, 120 and 150 are associated with geofences 115, 125 and 155, respectively. By knowing the location of the attacking PED, pairing requests at a specific seat (e.g., seat 120) that originate from outside the corresponding geofence (e.g., geofence 125) can be blocked.

In another example, the multiple geofences may be implemented for different classes in the airplane. That is, an attacker in the economy class will not be able to pair his PED with a seat in either business class or first class.

In some embodiments, the size of the allowable area (e.g., geofences 115, 125 and 155) is based on the wireless protocol that is used to implement the geofence. In an example, the allowable area may be large (e.g., a cabin zone) if BLUETOOTH (or more generally, a low-rate and low-latency wireless protocol) is used. In another example, the allowable area may be small (e.g., similar to the example shown in FIG. 1) if an RFID is embedded in the seatback. In this latter example, the application in the passenger PED can be configured to present the passenger with a selectable list of allowed seats to be paired with, based on the detected PED location.

Cabin and Maintenance Crew Location Validation for Wireless Access

Between flights, aircraft crew (maintenance crew or in-flight crew) can update the avionics software and other on-board systems using wireless access (provided, for example, using a wireless access point (WAP)) that is designed for that specific aircraft type or a particular airline. Unauthorized use of this wireless access may compromise operational safety, and must be restricted to only those crew members who are authorized to use it. In contrast to providing physical access using a wired connection or a unique code provided by a fixed crew GUI, a geofence may be implemented to provide wireless access to authorized users. Using a geofence is more operationally friendly because the crew is not required to manually enter a random code into their PED applications.

In some embodiments, a geofence may be implemented to encompass the whole aircraft, but restricted to the aircraft itself, so as to provide wireless access to the on-board flight and maintenance crew, but not to the ground crew (who may be contractors for baggage loading and/or unloading, but not employees of the airline), thereby eliminating the risk of unauthorized network access from a user outside the aircraft.

In an example, this may be achieved by equipping the cabin with wireless emitters (e.g., BLUETOOTH emitters) that transmit a random, aircraft-specific secret that an application on the crew PED retrieves and transmits back to the aircraft server as validation that they are within the permitted area. Herein, the wireless emitters are placed and tuned to transmit only within the geofence that has been implemented.

In another example, an RFID chip can be installed at permitted locations, and the crew members place their PEDs proximate to the RFID chip to receive the random, aircraft-specific secret, which is subsequently transmitted to the aircraft server to validate their access. As described in this example, embodiments of the disclosed technology can leverage operating protocols of crew members to ensure operational safety of the aircraft while increasing ease-of-use across several aspects of the journey.

Automation of Galley Appliances

In some embodiments, a geofence can be implemented around the galley area, which advantageously enables smart galley appliances to detect a crew member nearby and perform scripted actions. In an example, the presence of an open refrigerator door can trigger an alert to a crew PED if a crew member leaves the geofenced galley area. In another example, locking the oven or disabling the heating element can be triggered when a crew member is near the galley area. In yet another example, engaging the warming function of the oven can be triggered when a crew member leaves the geofence, or the microwave can be triggered to heat up an upcoming meal when the crew member enters the geofence. More generally, snack and meal preparation on the aircraft can be automated based on crew entering and leaving the geofence that is implemented around the galley area of the aircraft.

The automation of galley appliances may be achieved by using smart appliances as well as a one or more of BLUETOOTH, RFID or BLUETOOTH Low-Energy (BLE) detectors within the galley to implement the geofence. In an example, the smart appliances may have integrated wireless detectors. In another example, the smart appliances may have be communicatively coupled to a bus that allows for remote access from another server or computer (e.g., the IFEC system), which includes the scripting application engine. The security of the automation process can leverage cards or PEDs that are carried only by crew members, and validate the activation of the smart appliance scripts and processes.

Auto-Wake and Auto-Lock Based on Crew Proximity to Crew GUI

In existing implementations, aircraft are equipped with fixed crew GUIs that require login credentials be input prior to allowing access and enforce a time-out after which the screen auto-locks. This is configured to prevent unauthorized aspect, but is susceptible to an attacker accessing the system after the crew member has left a particular area and before the time-out expires. Reducing the time-out expiration might solve this problem, but reduces operational efficiencies because crew members will have to input the login credentials more frequently.

Embodiments of the disclosed technology can implement a geofence around the fixed crew GUI (e.g., for an area of a few feet), and be configured to auto-lock the GUI when a crew member leaves the geofence. This eliminates the possibility of unauthorized access as described above. Furthermore, the geofence may be configured to unlock the GUI if the same crew member enters the geofence within a predetermined window (e.g., typically a few minutes). If another crew member enters later, or if the predetermined window has expired, then the fixed crew GUI is configured to require the login credentials be input.

The auto-wake and auto-lock functionality may be achieved by using BLE or RFIDs to identify individual crew members based on their possession of a PED or access card, which would be associated with a unique identifier that would enable identification. In an example, a passive RFID system can be used to eliminate the need for batteries. In another example, the PED, access card or RFID hardware may be augmented with airline-signed digital certificates to significantly reduce (if not eliminate) the counterfeiting of these authorizing devices.

Herein, the crew PED or access card having the unique identifier that can be read wirelessly may be further associated with a unique login code (password or PIN) that is stored within the crew panel, and is required for an initial unlock by that crew member. This would require a database of crew PEDs or access cards and associated passwords or PINs to be kept up-to-date on the flight servers. Alternatively, and to avoid this operational overhead, the password or PIN could be stored within the access card or PED, and trust could be established via a digital certificate signing the password or PIN.

In yet another example, facial recognition may be used in lieu of the PED, access card or RFID hardware to increase the security capabilities of the system. To avoid having to keep an up-to-date biometric database on the aircraft of all possible crew members, the facial recognition system can be configured to operate only after an initial login by that crew member (when a picture of their face is captured and stored for that particular flight/flight segment).

Aircraft Location-Based Ad-Hoc Networking

In some embodiments, the geofencing implementations described in this document can also be used to locate an aircraft within an airport. In an example, the aircraft can use the geofence to first identify the airport, then the gate and terminal it is assigned to, and finally nearby aircraft. The airport identification would enable the aircraft to lookup regulatory allowances for WI-FI (or equivalent short-range wireless communication protocols, e.g., Li-Fi) usage at the airport, and can then use the designated frequencies to search for the other nearby aircraft. In the event that another nearby aircraft is found, the aircrafts can exchange information (e.g., media updates) that one aircraft, but not the other, has received. In another aircraft is not detected, the aircraft can periodically broadcast its availability for ad-hoc networking.

In an example, the airport can be identified using the cellular network. This can be achieved by identifying the country code upon arrival, and comparing the base station ID to a database of base stations and their locations. This advantageously reduces the installation and certification costs associated establishing connectivity between the aircraft system and avionics, which allows the retrieval of coordinates (e.g., latitude and longitude) from a flight desk system.

Using geofencing to enable short-range wireless communication protocol (e.g., WI-FI, Li-Fi) usage advantageously reduces cellular usage, which can significantly reduce operating costs. Furthermore, using ad-hoc WI-FI enables faster networking without the airport having invested in the significant costs associated with installing WI-FI Gatelink infrastructure.

Cabin Sanitization Using Disinfection Machines

Figure 2A:
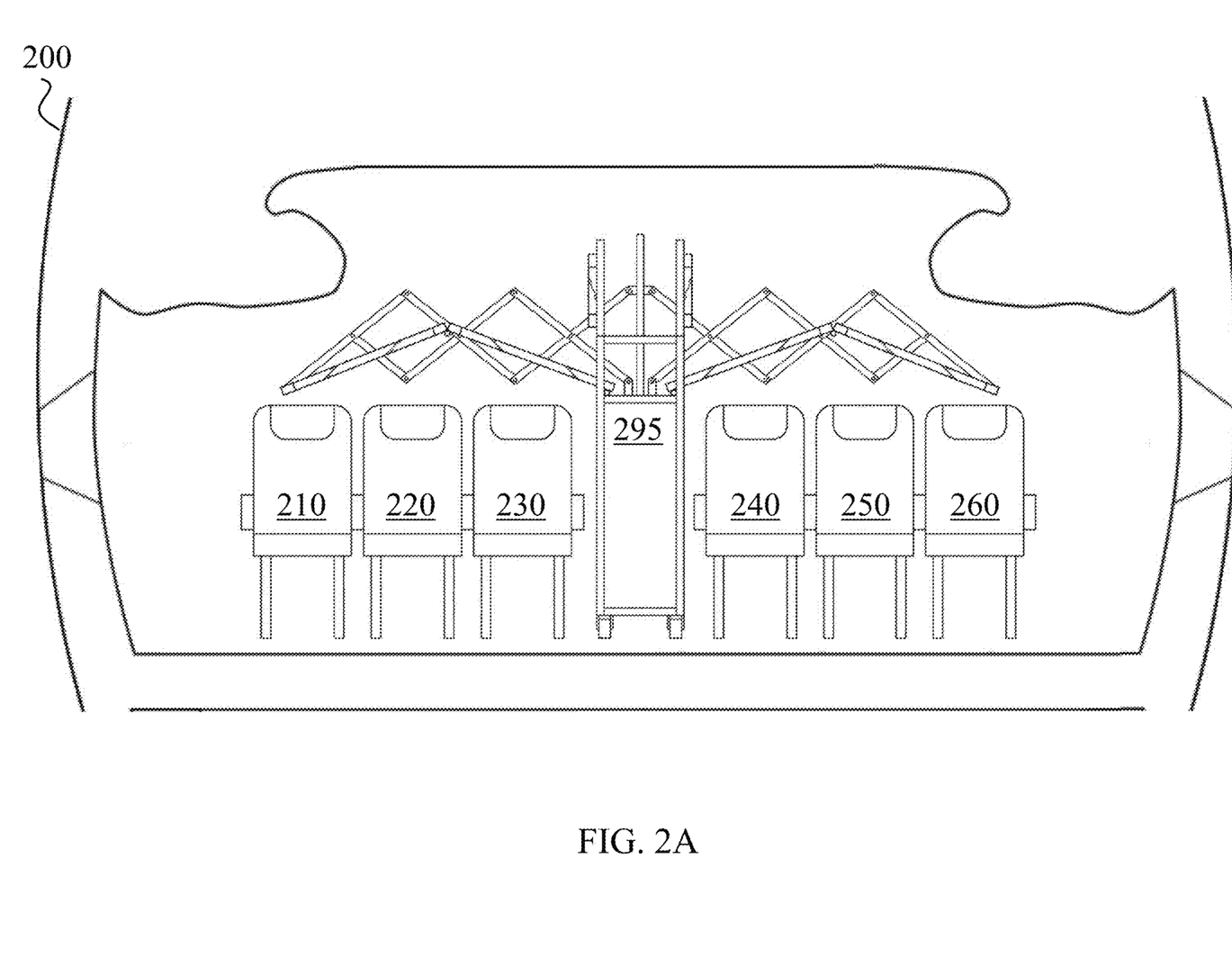
FIGS. 2A and 2B show another example of using a geofence in an aircraft for aircraft sanitization and cleaning.
Figure 2B:
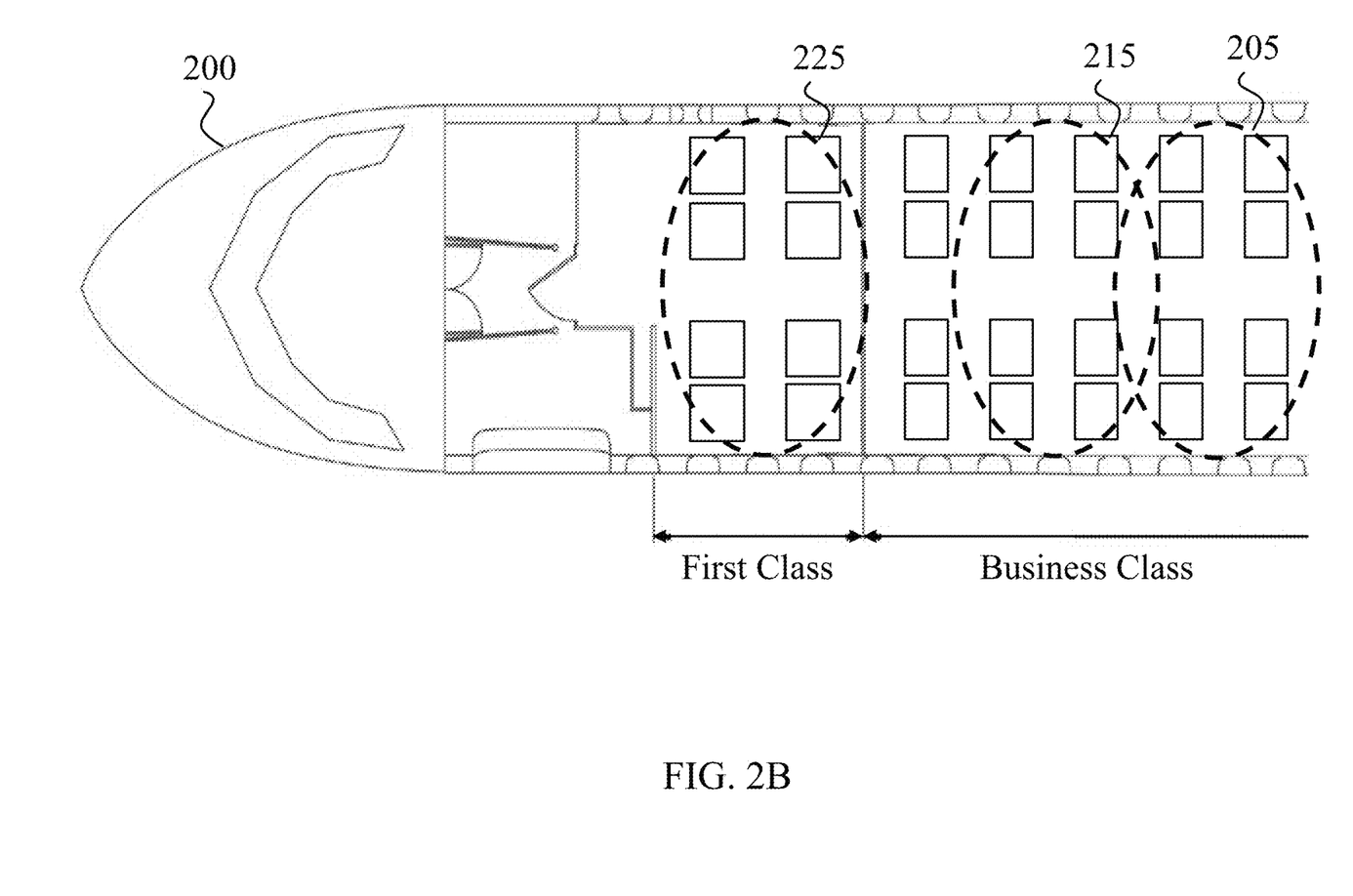

In some embodiments, and as shown in FIGS. 2A and 2B, a geofence in an aircraft can be used for aircraft sanitization and cleaning. As shown in FIG. 2A, a disinfection machine 295 can be configured to maneuver down the aisle and clean and/or disinfect the rows of seats on either side of the aisle (seats 210, 220, 230 and 240, 250, 260, respectively). In an example, the disinfection machine 295 may be a special cabin sanitizing device that uses high powered ultra-violet LED lights to sanitize aircrafts interior and furnishings. As shown in FIG. 2B, multiple geofences (e.g., 205, 215 and 225) may be configured to identify that the disinfection machine 295 is within a particular geofence and subsequently ensure that each IFEC system within that geofence is turned off prior to the disinfection machine being turned on for those rows of seats.

In some embodiments, the disinfection machine 295 may be equipped with a hardware token (e.g., an RFID tag) that enables its identification within a particular geofence, and the IFEC systems on seatbacks within some proximity of the disinfection machine can be turned off prior to starting the cleaning and/or sanitization process.

Cabin Class Location Identification of Passenger PED

In some embodiments, a geofence may be implemented to coincide with passenger class zones, and used to discriminate between those class zones (e.g., first class, business class, economy class). Based on the geofence implementation, class-specific services (e.g., discounted or free access to drinks and streaming movies) may be offered to the passenger PEDs who locations have been determined to be within the appropriate geofence.

Existing WI-FI systems cannot be used to implement class-specific services because WI-FI signals leak beyond the cabin zones. In contrast, embodiments of the disclosed technology can be configured to establish a perimeter with BLE beacons or RFIDs embedded in the seats, which would enable the airline application on the passenger PED to interface with nearby BLE beacons or RFIDs to identify the cabin zone in which the passenger is sitting.

Figure 3:
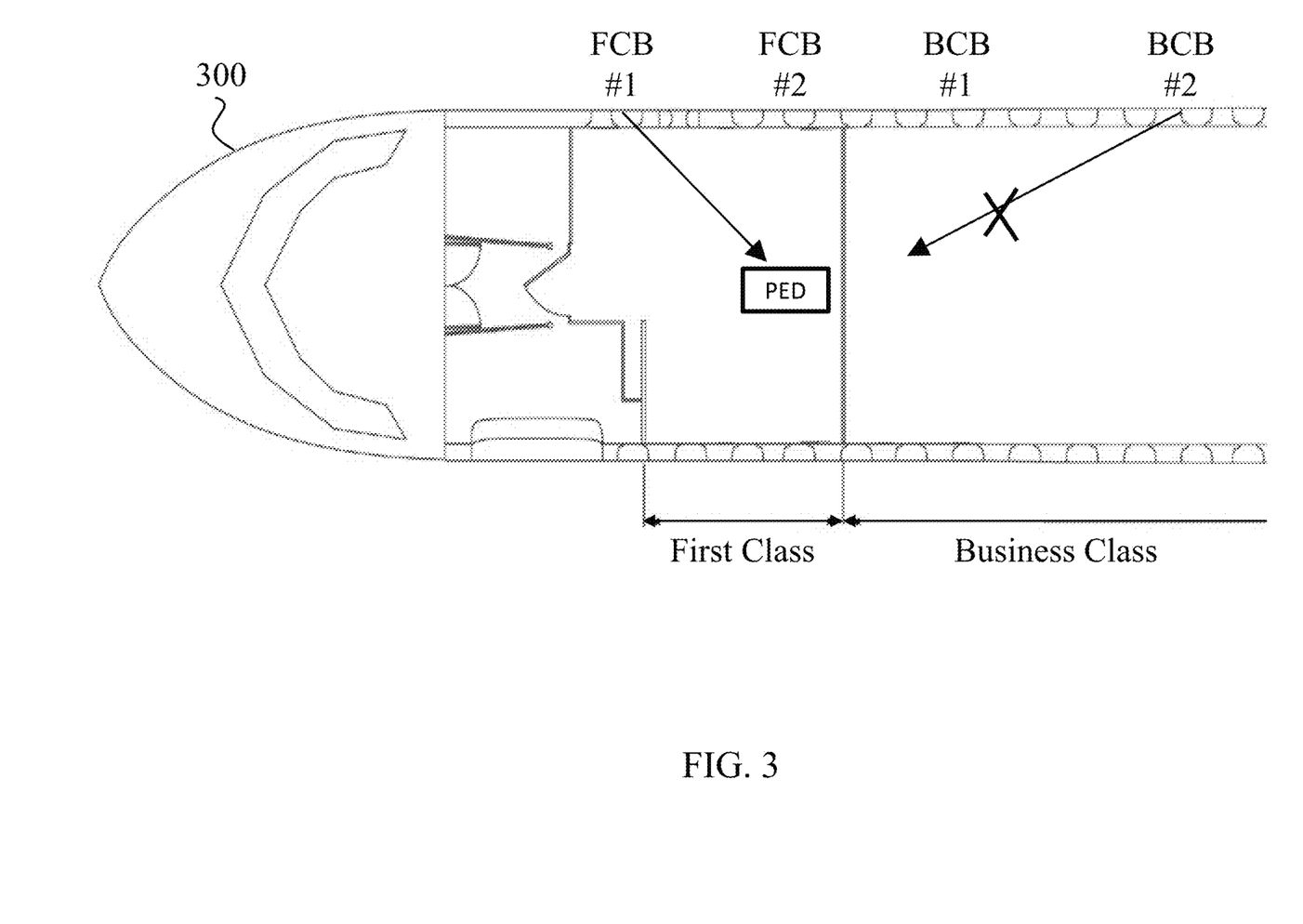
FIG. 3 shows yet another example of using a geofence in an aircraft.

FIG. 3 shows an example of using a geofence for class zone identification in the case when the passenger is at the border of two cabin zones. As shown therein, multiple beacons (denoted First-Class Beacons (FCB) and Business-Class Beacons (BCB) for the first class zone and business class zone, respectively) can be used to set up a voting system that is based on signal strength, which can be used to determine the passenger's cabin zone.

FIG. 3 shows the passenger PED being at the edge of the FCB #1 range and being out of range of BCB #2. In this case, the signal strengths of the four beacons will be:

$$SNR_{FCB\ \#2} > SNR_{BCB\ \#1} > SNR_{FCB\ \#1} > SNR_{BCB\ \#2}.$$

Based on the above order that ranks the FCB beacons higher than the BCB beacons (on average), the logic of the airline application on the passenger PED can conclude that the passenger is in the first-class cabin.

In some embodiments, and to prevent erroneous readings due to blocked signals, the detection of the beacon signals by the passenger PED is performed periodically at different times to achieve a consistent determination. In other embodiments, and to prevent spoofing, the beacons can be configured to transmit a random value that is presented to the aircraft by the application, which then receives the resulting class of the passenger. In this scenario, the beacons are connected to the wireless system that services passengers, and thus enables the establishment of the random value.

Examples of Geofence Implementations

In some embodiments, implementing a geofence can include:
  Storing the geofence data as multiple coordinates for a polygon geofence or as a radius and center point coordinate for a circular geofence. For a commercial transport vehicle, the footprint of the vehicle may be used to modify the coordinates of the polygon geofence.
  Checking if the current location coordinate (latitude, longitude) of an entity is entering or exiting a geofence. To find out if an entity is entering or exiting, check if last location coordinate of the entity was inside or outside of the geofence.
    If the last location coordinate of an entity was outside of the geofence and the current location coordinate of the entity is inside the geofence, then the entity is entering the geofence.
    If last location coordinate of an entity is inside the geofence and current location coordinate of the entity is outside the geofence then the entity is exiting the geofence.

Figure 4A:
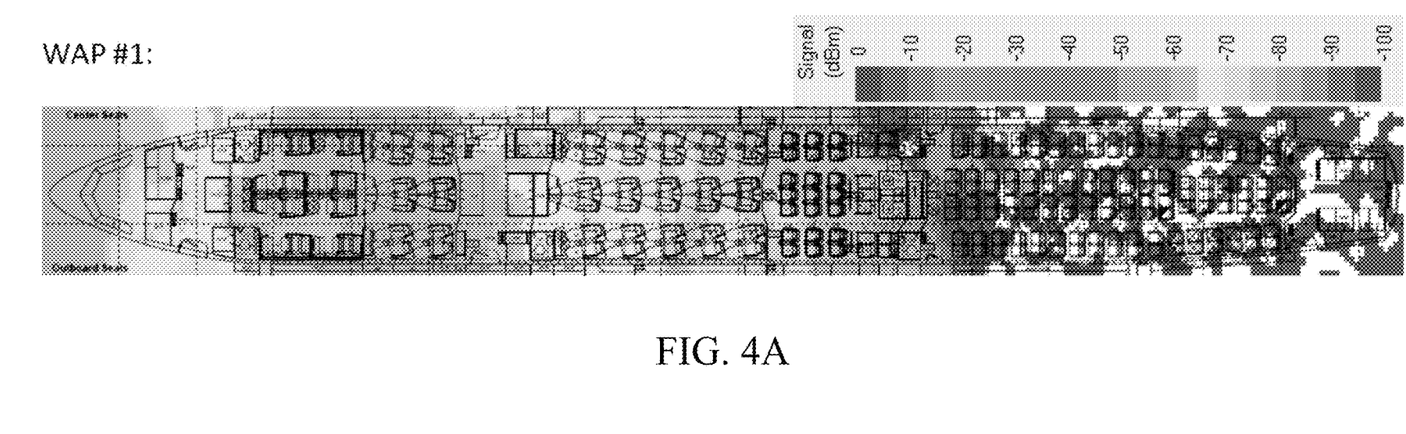
FIGS. 4A-4F show an example of a heat map of WI-FI signal strength in an aircraft.
Figure 4B:
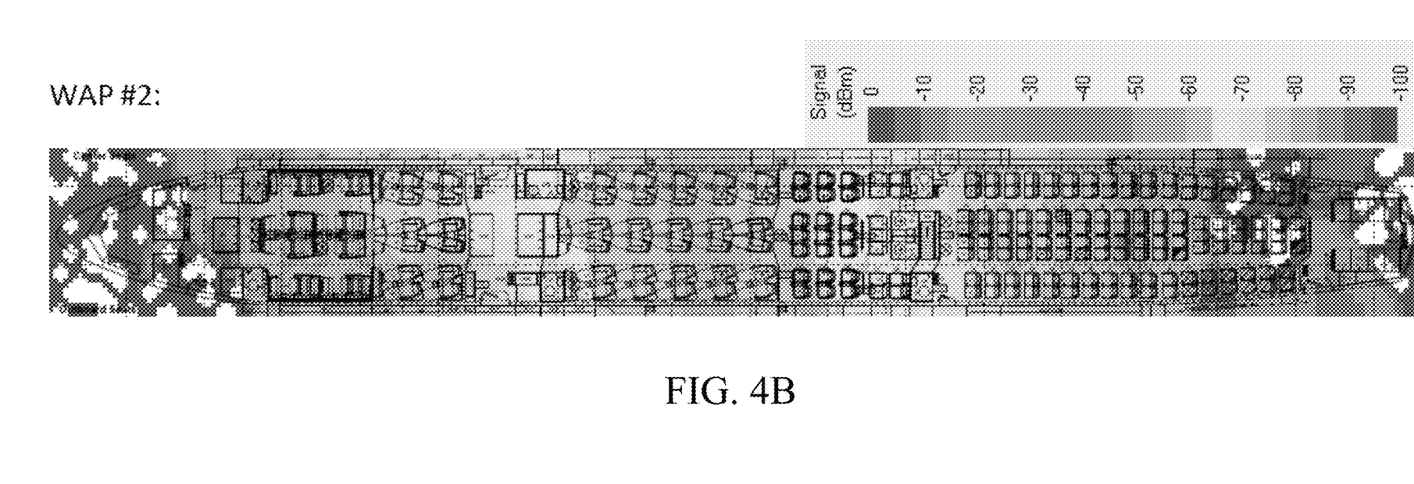
Figure 4C:
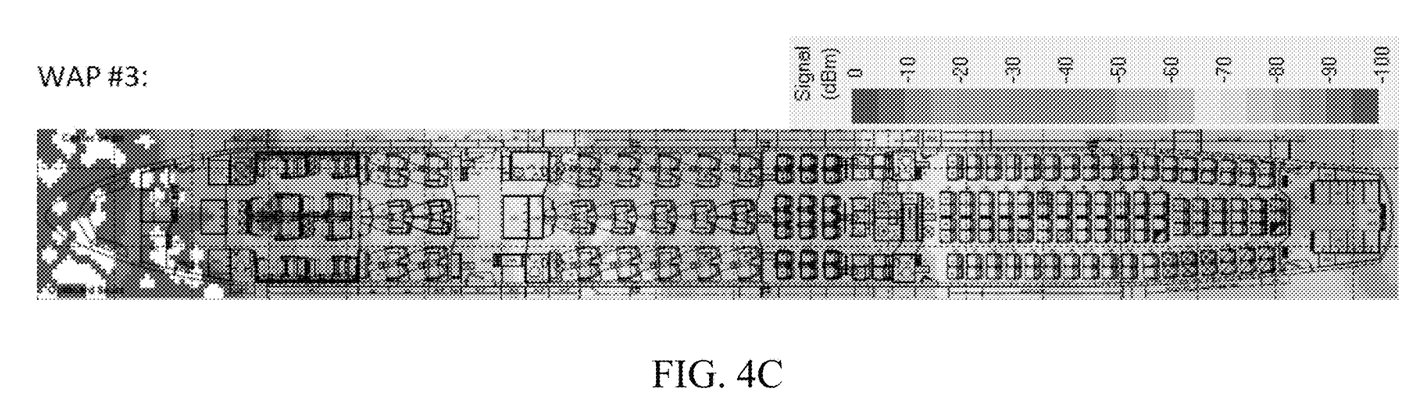
Figure 4D:
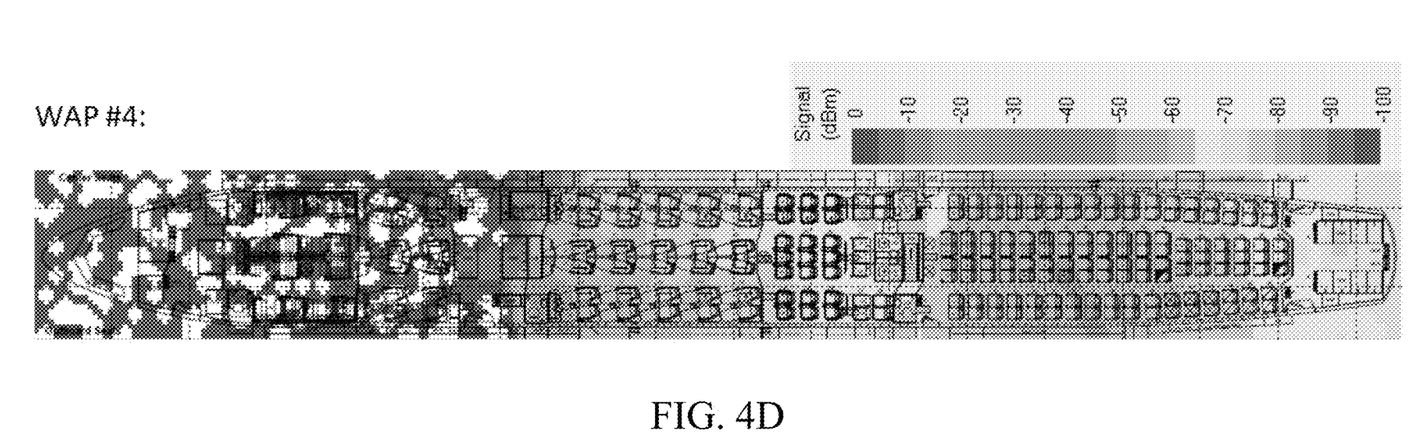
Figure 4E:
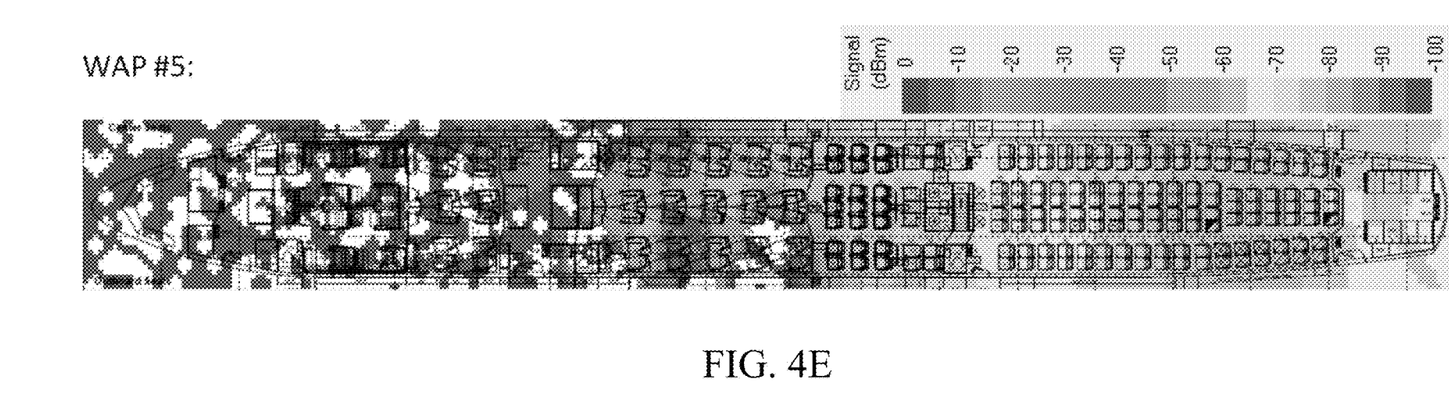
Figure 4F:
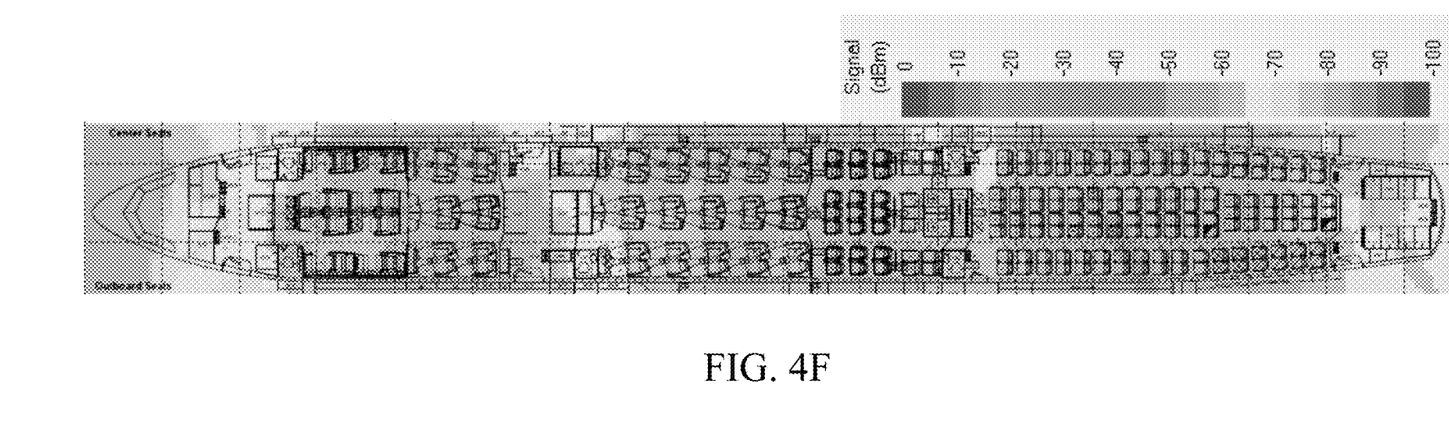

In some embodiments, the coordinates that define the polygon geofence can be based on a heat map of signal strength at one or more frequencies used by a wireless protocol in the commercial transport vehicle. FIGS. 4A-4E show the heat map of signal strength for a WI-FI signal at 2.4 GHz for each of five wireless access points (WAPs) distributed in the aircraft that have an output power of 10 dBm. As shown therein, no single WAP can provide coverage for the entire aircraft, but their combination results in strong signal coverage throughout the aircraft, as shown in FIG. 4F.

In some embodiments, the heat maps can be used to implement the geofence. In an example, the overall heat map (shown in FIG. 4F) may be used to configure the geofence to ensure that wireless access is restricted to on-flight crew and not available to ground crew. In another example, the heat map for WAP #1 (shown in FIG. 4A) can be used to configure the geofence for the first class cabin zone. In yet another example, the heat maps for WAP #2 and WAP #3 (shown in FIGS. 4B and 4C, respectively) can be used to configure the geofence for the business class cabin zone. In the latter case, the specific heat maps can be used to set thresholds and calibrate the voting system that is used to determine the passenger PED location and class.

Embodiments of Geofencing in a Commercial Transport Vehicle

Figure 5:
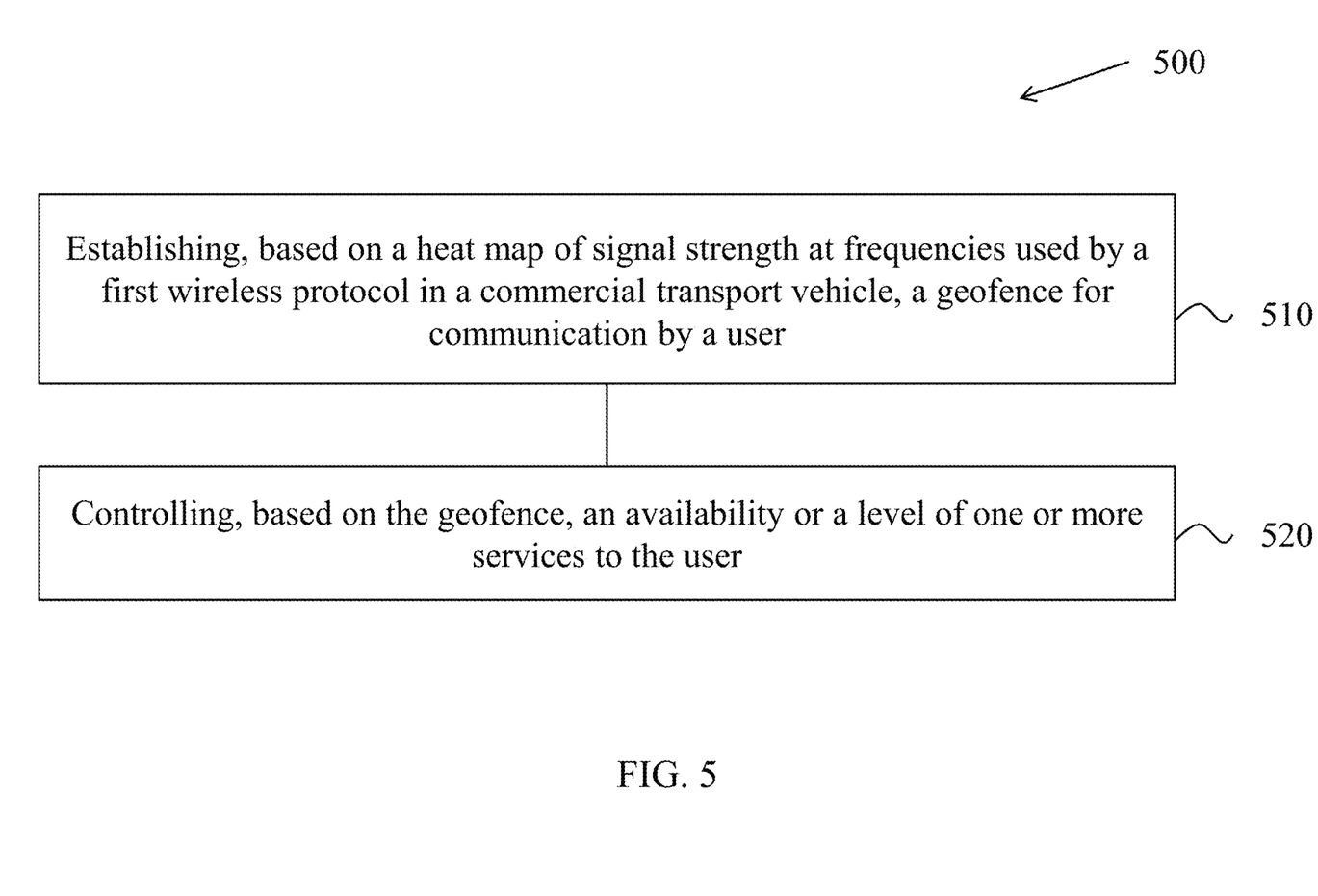
FIG. 5 shows a flowchart of an example method for providing geofencing.

FIG. 5 shows a flowchart of an example method 500 for geofencing in a commercial transport vehicle, in accordance with embodiments of the disclosed technology. The method 500 includes, at operation 510, establishing, based on a heat map of signal strength at frequencies used by a first wireless protocol in a commercial transport vehicle, a geofence for communication by a user.

The method 500 includes, at operation 520, controlling, based on the geofence, an availability or a level of one or more services to the user.

In some embodiments, the geofence comprises one or more boundaries within the commercial transport vehicle, and the one or more services are deactivated if a location of the user is outside the one or more boundaries of the geofence.

In some embodiments, the user is a passenger in the commercial transport vehicle.

In some embodiments, the method 500 further comprises the operation of establishing, over a second wireless protocol, a pairing between a portable electronic device (PED) of the passenger and a seat location of the passenger, wherein the providing the one or more services is further based on the pairing.

In some embodiments, the seat location of the passenger is indicative of a passenger class zone, the geofence is further based on the passenger class zone, and the one or more services are offered to the passenger through the PED.

In some embodiments, the commercial transport vehicle is an aircraft, the passenger class zone comprises first class or business class, and the one or more services comprise discounted or free access to in-flight entertainment or communications.

In some embodiments, the method 500 further comprises the operation of blocking, upon a determination that the passenger is outside the geofence, a pairing request between a portable electronic device (PED) of the passenger and a seat location of the passenger.

In some embodiments, the user is a flight crew member of the commercial transport vehicle.

In some embodiments, the first wireless protocol and the second wireless protocol are selected from a group consisting of a BLUETOOTH protocol, a WI-FI protocol, a near-field communication (NFC) protocol, a cellular protocol, and a 60 GHz communication protocol.

In some embodiments, the first and second wireless protocols are identical.

Figure 6:
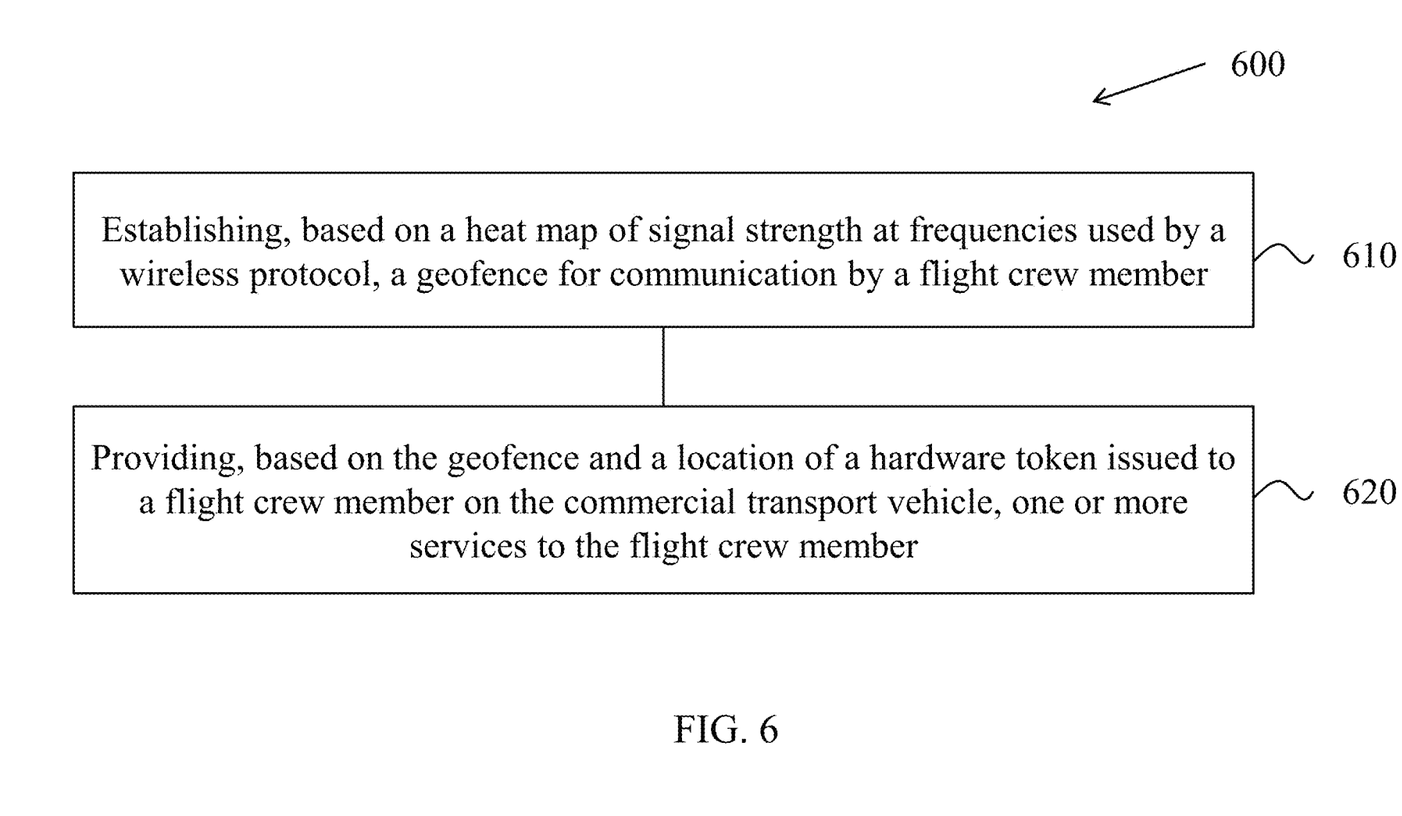
FIG. 6 shows a flowchart of another example method for providing geofencing.

FIG. 6 shows a flowchart of another example method 600 for geofencing in a commercial transport vehicle, in accordance with embodiments of the disclosed technology. The method 600 includes, at operation 610, establishing, based on a heat map of signal strength at frequencies used by a wireless protocol, a geofence for communication by a flight crew member.

The method 600 includes, at operation 620, providing, based on the geofence and a location of a hardware token issued to a flight crew member on the commercial transport vehicle, one or more services to the flight crew member.

Embodiments of the disclosed technology include a system for geofencing in a commercial transport vehicle includes a hardware token issued to a flight crew member of the commercial transport vehicle, a plurality of wireless access points (WAPs), and a processor that is configured to establish, based on a heat map of signal strength at frequencies used by a wireless protocol, a geofence for communication by the flight crew member, and provide, based on the geofence and a location of the hardware token on the commercial transport vehicle, one or more services to the flight crew member, wherein the wireless protocol is used by the plurality of WAPs, wherein the geofence comprises one or more boundaries within the commercial transport vehicle, and wherein the hardware token is made unavailable to passengers of the commercial transport vehicle.

In some embodiments, the processor is further configured to determine that a disinfection machine configured to perform an ultraviolet (UV) sanitization process is within the geofence, and deactivate each in-flight entertainment connectivity (IFEC) system in one or more rows of seats within the geofence prior to the UV sanitization process being activated for the one or more rows of seats.

In some embodiments, the one or more boundaries comprise a perimeter of the commercial transport vehicle, and wherein a ground crew member outside the commercial transport vehicle is outside the geofence and cannot access the wireless protocol.

In some embodiments, the hardware token is issued to the ground crew member.

In some embodiments, the commercial transport vehicle is an aircraft, and the system further comprises a galley appliance, within the geofence, configured to detect a presence of the hardware token and perform a scripted action.

In some embodiments, the galley appliance is a microwave or a conventional oven, and wherein the scripted action comprises activating a heating element for a predetermined duration of time.

In some embodiments, the system further includes a graphical user interface (GUI), within the geofence, configured to perform an unlock operation upon a determination that the flight crew member with the hardware token has entered the geofence, and further configured to perform an auto-lock operation upon a determination that the flight crew member has exited the geofence.

In some embodiments, the unlock operation is triggered in response to a determination that the flight crew member has remained within the geofence for a first duration of time, or that the flight crew member was previously within the geofence for less than a second predetermined duration of time.

In some embodiments, the hardware token is an access card comprising a digital certificate and a passive radio frequency identification (RFID).

In some embodiments, the wireless protocol is selected from a group consisting of a BLUETOOTH protocol, a WI-FI protocol, a near-field communication (NFC) protocol, a cellular protocol, and a 60 GHz communication protocol.

In some embodiments, the commercial transport vehicle is an arriving aircraft, the one or more boundaries encompass an arrival airport, and the one or more services comprise providing a list of services available at the arrival airport and an identification of a gate and a terminal assigned to the arriving aircraft.

In some embodiments, the one or more services further comprise identification of one or more nearby aircraft, and at least one of the plurality of WAPs is configured to transmit the list of services available at the arrival airport to at least one of the one or more nearby aircraft.

Figure 7:
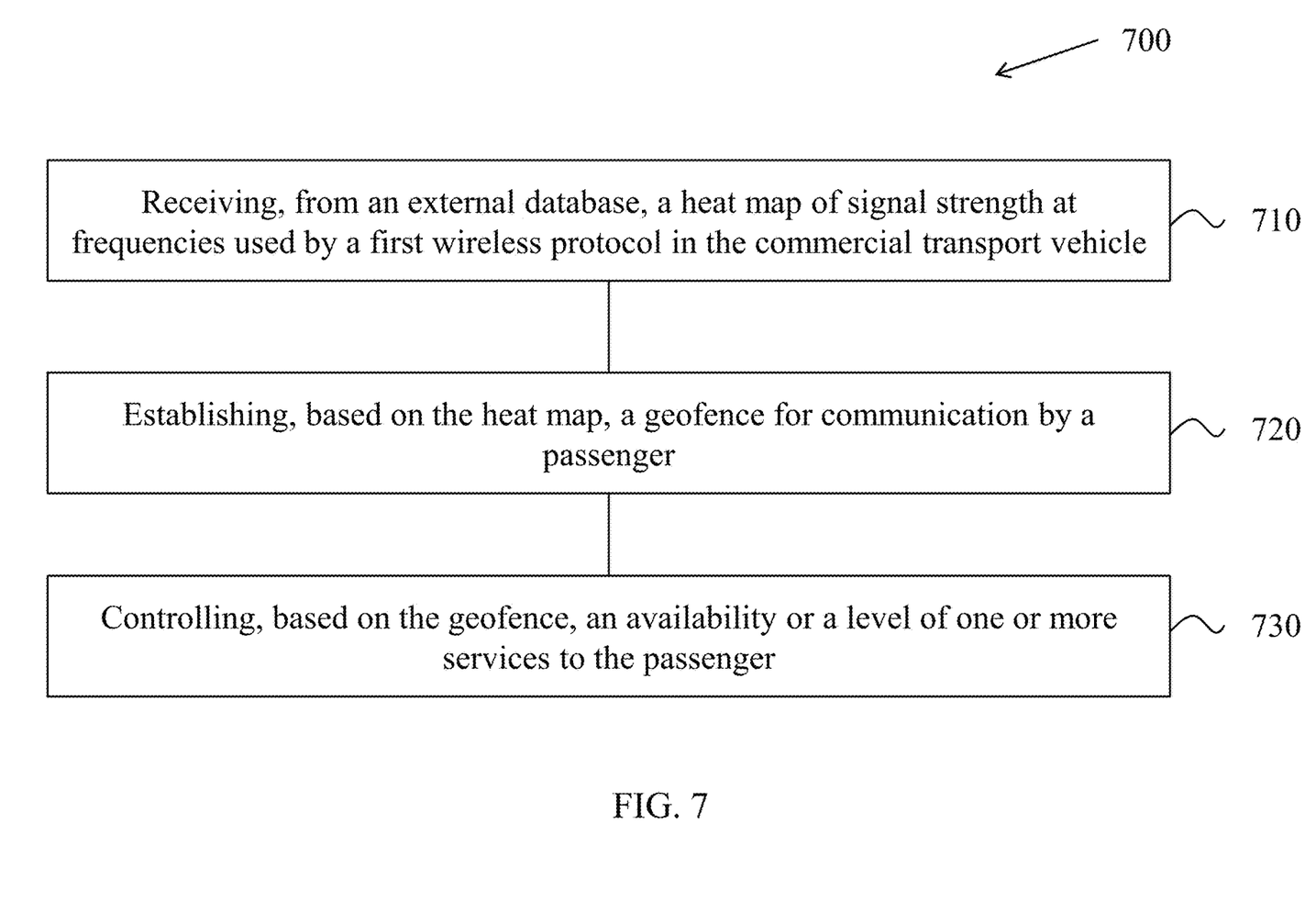
FIG. 7 shows a flowchart of yet another example method for providing geofencing.

FIG. 7 shows a flowchart of another example method 700 for geofencing in a commercial transport vehicle, in accordance with embodiments of the disclosed technology. The method 700 includes, at operation 710, receiving, from an external database, a heat map of signal strength at frequencies used by a first wireless protocol in the commercial transport vehicle.

The method 700 includes, at operation 720, establishing, based on the heat map, a geofence for communication by a passenger.

The method 700 includes, at operation 730, controlling, based on the geofence, an availability or a level of one or more services to the passenger.

Embodiments of the disclosed technology include a non-transitory computer-readable storage medium having instructions stored thereupon for geofencing in a commercial transport vehicle includes instructions for receiving, from an external database, a heat map of signal strength at frequencies used by a first wireless protocol in the commercial transport vehicle, instructions for establishing, based on the heat map, a geofence for communication by a passenger, and instructions for controlling, based on the geofence, an availability or a level of one or more services to the passenger, wherein the geofence comprises one or more boundaries within the commercial transport vehicle, and wherein the one or more services are deactivated if a location of the passenger is outside the one or more boundaries of the geofence.

In some embodiments, the storage medium further comprises instructions for establishing, over a second wireless protocol, a pairing between a portable electronic device (PED) of the passenger and a seat location of the passenger, and the providing the one or more services is further based on the pairing.

In some embodiments, the seat location of the passenger is indicative of a passenger class zone, the geofence is further based on the passenger class zone, and the one or more services are offered to the passenger through the PED.

In some embodiments, the commercial transport vehicle is an aircraft, the passenger class zone comprises first class or business class, and the one or more services comprise discounted or free access to in-flight entertainment or communications.

In some embodiments, the storage medium further comprises instructions for blocking, upon a determination that the passenger is outside the geofence, a pairing request between a portable electronic device (PED) of the passenger and a seat location of the passenger.

In some embodiments, the first wireless protocol and the second wireless protocol are selected from a group consisting of a BLUETOOTH protocol, a WI-FI protocol, a near-field communication (NFC) protocol, a cellular protocol, and a 60 GHz communication protocol.

In some embodiments, the first and second wireless protocols are identical.

Figure 8:
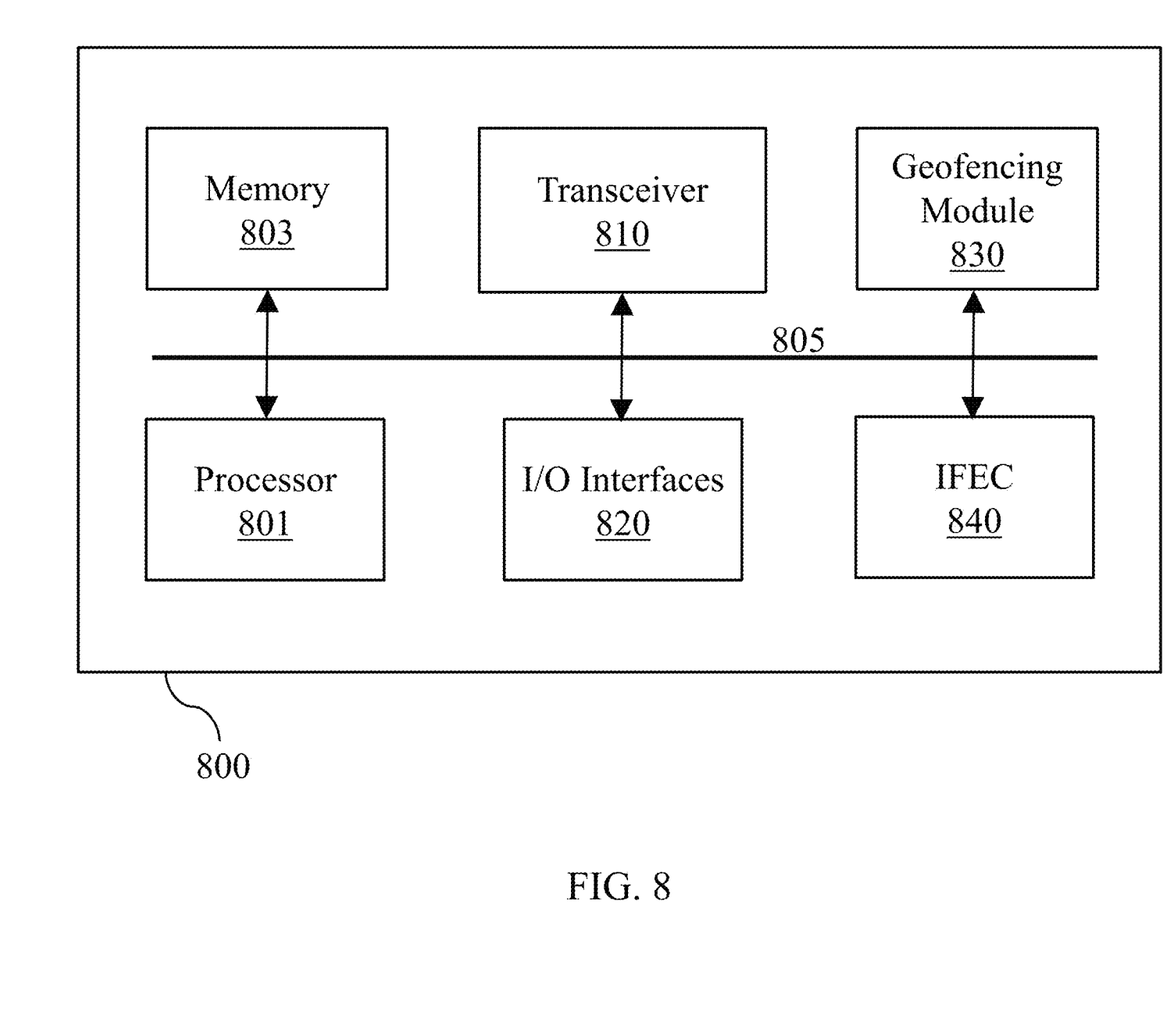
FIG. 8 shows an example of an apparatus that can implement methods and techniques for geofencing, in accordance with embodiments of the disclosed technology.

FIG. 8 shows an example architecture of a device 800 for geofencing in a commercial transport vehicle. As shown therein, the device may include a processor 801 and a memory 803, which are connected to a bus 805. In an example, the bus 805 may be a Controller Area Network (CAN) bus. In another example, the bus 805 may be an avionics data bus (e.g., ARINC 429, 615, 629 or 664). The processor 801 and memory 803 are further connected, via the bus 805, to at least a transceiver 810, input/output (I/O) interfaces 820, a geofencing module 830 and an in-flight entertainment connectivity (IFEC) system 840.

In some embodiments, one or more of the components of the device 800, shown in FIG. 8, may be combined, or implemented independently in another device. For example, the IFEC system 840 may not be directly connected to the bus 805, but may be connected to a different bus (not shown in FIG. 8) that can communicate (either through a wired or wireless connection) with bus 805. For another example, the geofencing module 830 or the transceiver 810 may be part of the IFEC system 840, instead of a separate component. Alternative embodiments of the architecture shown in FIG. 8, which advantageously enable geofencing in a commercial transport vehicle, include various combinations of the components shown therein.

In some embodiments, the transceiver 810 includes a beacon (e.g., FCB or BCB in FIG. 2). In other embodiments, the memory 803 may include the logically separated storage segments that store the avionics software and media content. In yet other embodiments, the I/O interfaces 820 include hardware and software components that enable the IFEC system and geofencing module to communicate with the external fixed crew GUI (not shown in FIG. 8).

It is intended that the specification, together with the drawings, be considered exemplary only, where exemplary means an example and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A method for geofencing in a commercial transport vehicle, comprising:
establishing, based on a heat map of signal strength at frequencies used by a first wireless protocol in the commercial transport vehicle, a geofence for communication by a user; and
controlling, based on the geofence, an availability or a level of one or more services to the user,
wherein the geofence comprises one or more boundaries within the commercial transport vehicle, and wherein the one or more services are deactivated if a location of the user is outside the one or more boundaries of the geofence.

2. The method of claim 1, wherein the user is a passenger in the commercial transport vehicle.

3. The method of claim 2, further comprising:
establishing, over a second wireless protocol, a pairing between a portable electronic device (PED) of the passenger and a seat location of the passenger,
wherein the providing the one or more services is further based on the pairing.

4. The method of claim 3, wherein the seat location of the passenger is indicative of a passenger class zone, wherein the geofence is further based on the passenger class zone, and wherein the one or more services are offered to the passenger through the PED.

5. The method of claim 4, wherein the commercial transport vehicle is an aircraft, wherein the passenger class zone comprises first class or business class, and wherein the one or more services comprise discounted or free access to in-flight entertainment or communications.

6. The method of claim 3, further comprising:
blocking, upon a determination that the passenger is outside the geofence, a pairing request between a portable electronic device (PED) of the passenger and a seat location of the passenger.

7. The method of claim 1, wherein the user is a flight crew member of the commercial transport vehicle.

8. The method of claim 1, wherein the first wireless protocol and the second wireless protocol are selected from a group consisting of a BLUETOOTH protocol, a WI-FI protocol, a near-field communication (NFC) protocol, a cellular protocol, and a 60 GHz communication protocol.

9. The method of claim 8, wherein the first wireless protocol is identical to the second wireless protocol.

10. An apparatus for geofencing in a commercial transport vehicle, comprising:
a processor configured to:
receive, from an external database, a heat map of signal strength at frequencies used by a first wireless protocol in the commercial transport vehicle;
establish, based on the heat map, a geofence for communication by a passenger; and
control, based on the geofence, an availability or a level of one or more services to the passenger,
wherein the geofence comprises one or more boundaries within the commercial transport vehicle, and wherein the one or more services are deactivated if a location of the passenger is outside the one or more boundaries of the geofence.

11. The apparatus of claim 10, wherein the processor is further configured to:
establish, over a second wireless protocol, a pairing between a portable electronic device (PED) of the passenger and a seat location of the passenger,
wherein the providing the one or more services is further based on the pairing.

12. The apparatus of claim 11, wherein the seat location of the passenger is indicative of a passenger class zone, wherein the geofence is further based on the passenger class zone, and wherein the one or more services are offered to the passenger through the PED.

13. The apparatus of claim 12, wherein the commercial transport vehicle is an aircraft, wherein the passenger class zone comprises first class or business class, and wherein the one or more services comprise discounted or free access to in-flight entertainment or communications.

14. The apparatus of claim 11, wherein the processor is further configured to:
block, upon a determination that the passenger is outside the geofence, a pairing request between a portable electronic device (PED) of the passenger and a seat location of the passenger.

15. The apparatus of claim 10, wherein the first wireless protocol and the second wireless protocol are selected from a group consisting of a BLUETOOTH protocol, a WI-FI protocol, a near-field communication (NFC) protocol, a cellular protocol, and a 60 GHz communication protocol.

16. The apparatus of claim 14, wherein the first wireless protocol is identical to the second wireless protocol.

* * * * *